April 21, 1953 J. W. FOGWELL ET AL 2,635,867
PRESSURIZED COAL SCALE
Filed May 22, 1951 3 Sheets-Sheet 1

INVENTORS
Joseph Wray Fogwell and
Arthur J. Stock
BY Stevens, Davis, Miller & Mosher
ATTORNEYS April 21, 1953  J. W. FOGWELL ET AL  2,635,867
PRESSURIZED COAL SCALE Filed May 22, 1951  3 Sheets-Sheet 3

INVENTORS
*Joseph Wray Fogwell* and
*Arthur J. Stock*

BY *Stevens, Davis, Miller and Mosher*
ATTORNEYS

Patented Apr. 21, 1953

2,635,867

UNITED STATES PATENT OFFICE 2,635,867

PRESSURIZED COAL SCALE

Joseph Wray Fogwell, Lakewood, and Arthur J. Stock, Rocky River, Ohio, assignors to Stock Equipment Company, a corporation of Ohio Application May 22, 1951, Serial No. 227,674

8 Claims. (Cl. 265—27)

This invention relates to a pressurized scale and more particularly to a coal scale to be utilized with a pressure or vacuum feed to a furnace in a coal combustion system similar to that described in the co-pending Arthur J. Stock application, Serial No. 254,130, filed October 31, 1951.

There are many instances where it is necessary and desirable to weigh materials in a hopper under pressure while maintaining the weighing lever assembly for the hopper separate and apart therefrom. This separation is usually an essential feature of arrangements of this nature, and is accomplished by utilizing independent pressure-tight compartments for the weigh hopper and weigh lever assembly. The separation is considered necessary to preserve the sensitive balance of the weigh lever assembly from distorting or destroying tendencies such as those caused by a deposition or accumulation of foreign materials upon the various levers. Also it serves to prevent the materials contained in the hopper from deleteriously affecting the lever assembly. For example, the materials may have corrosive or oxidizing effects upon the levers of the weigh lever assembly. Additionally, it is often considered desirable to have the lever assembly readily accessible for purposes of adjustment and that such access should be able to be obtained without interference with the materials in the hopper under pressure. As for example, during the weighing of coal, the coal dust present is so great that unless the weigh lever assembly is kept separate from the weigh hopper, the coal dust will accumulate on the levers and cause corrosion and will otherwise interferere with the weighing operation.

The maintenance of separate pressure-tight compartments for the weigh hopper and the weigh lever assembly is extremely necessary for the previously described reasons. Nevertheless, merely maintaining the separation will not, of itself, result in accurate weighings. This is so in view of the pressure differential that exists between the weigh hopper compartment and the weigh lever assembly compartment inasmuch as the former is under pressure whereas the latter is generally at atmospheric pressure. This pressure difference is generally the result of the manner in which the furnace is operated. For example, use of a cyclone-type furnace operating under pressure results in a back pressure throughout the feeding part of the system. Additionally, the only connection between the two compartments usually consists of two rods which are attached to the weigh hopper and which transmit the gross load of the weigh hopper plus the material contained therein to the weigh lever assembly. However, some scale hoppers employ three and sometimes four connecting rods to transmit the gross load. In order to make the joint between the compartments a pressure-tight seal, flexible seals in the form of molded rubber bellows are applied to the rods in a conventional manner. This sealing arrangement, however, further enlarges the weigh errors caused by dust accumulation since the unequal pressure caused by the weigh hopper compartment being under pressure results in the molded rubber bellows on the inside of the weigh hopper compartment producing an air piston action which manifests itself as a force acting directly to either raise the weigh hopper or to thrust the weigh hopper sideways. If a side thrust exists, it must be taken up in the weigh levers. Hence, the movement of the levers which is normally substantially free of friction is subjected to friction under the condition of a sideways thrust. This results in a further error in weighing.

Accordingly, this invention provides balanced molded rubber bellows arrangements wherein the pressure in the weigh hopper is offset by balancing the forces on the connecting rods caused by the pressure in such a manner that the connecting rods will only transmit the gross load of the weigh hopper and the coal held therein. This is accomplished generally by providing an arrangement of bellows so that the air piston action tending to either raise or thrust the weigh hopper sideways is completely counterbalanced by the creation of an air piston action equal and opposite thereto.

It is an object of this invention to provide a pressurized scale which will give accurate weighings.

It is another object of this invention to provide a pressurized coal scale for use with a pressure or vacuum feed to a furnace system which will be more efficient, accurate, and economical than any which have heretofore been available.

Other objects and advantages of the present invention will become apparent from a detailed description of the following specification when taken in conjunction with the drawings in which.

Figure 1:
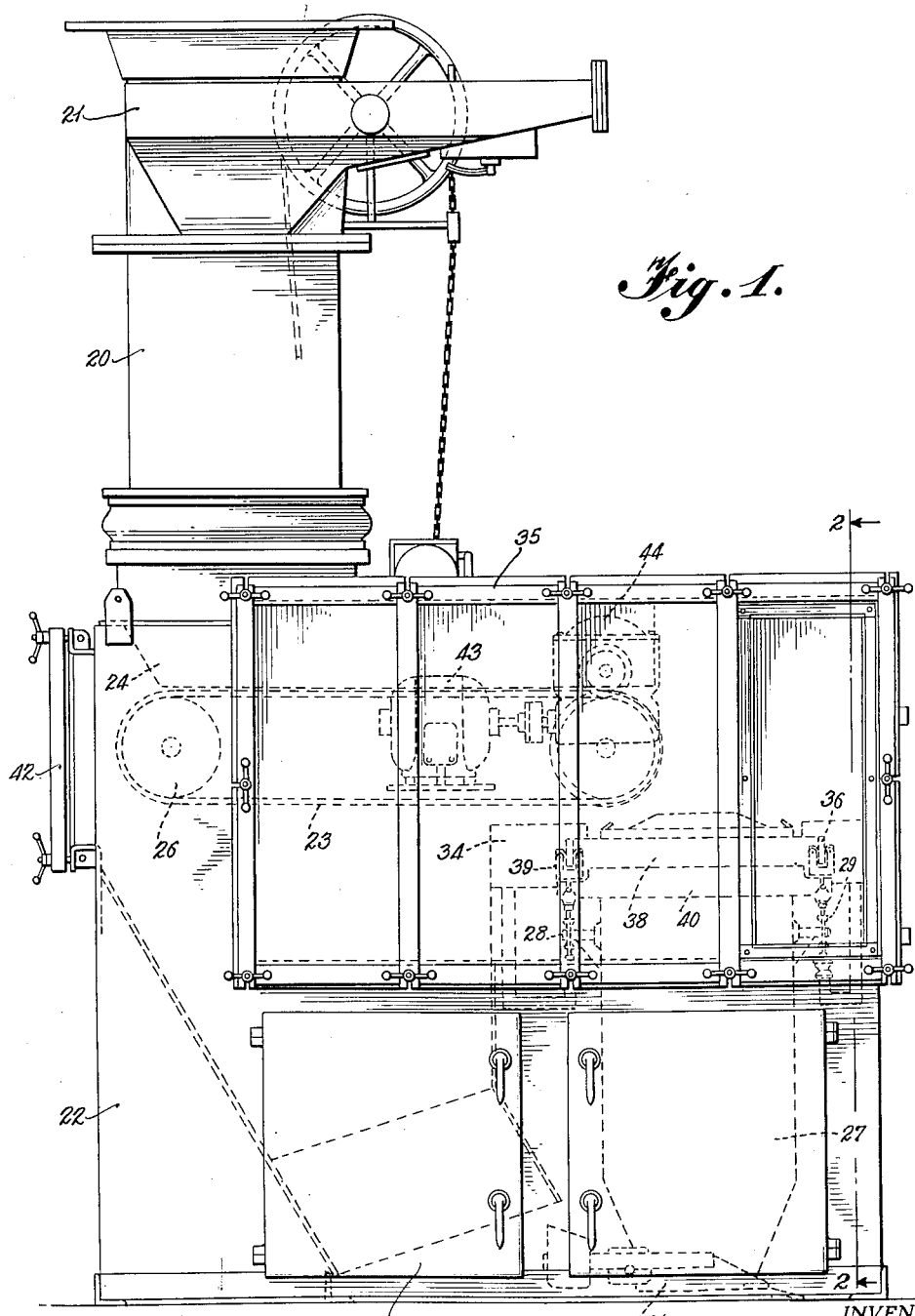
Figure 1 is a view in side elevation showing a pressurized coal scale for use with a feeding system for a pressure furnace or vacuum employing apparatus of the present invention.
Figure 2:
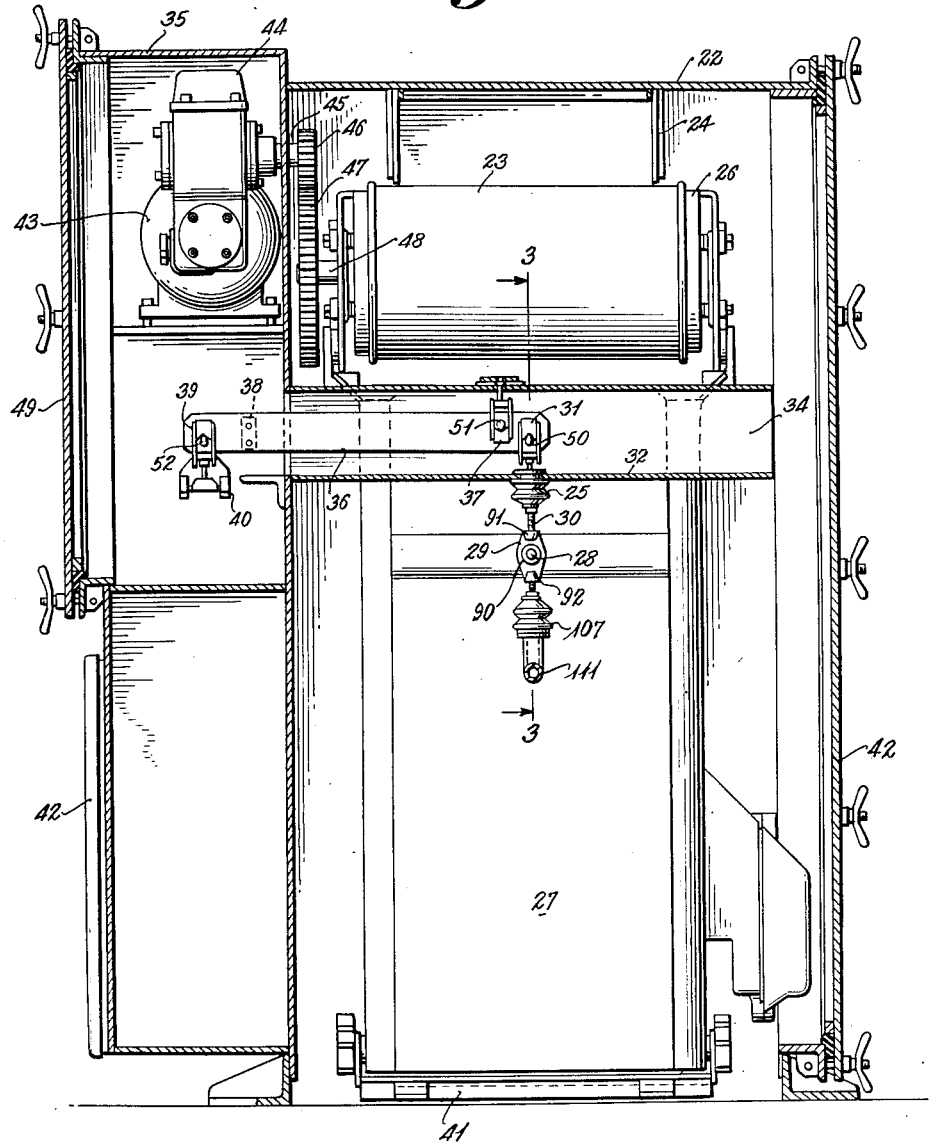
Figure 2 is a view in vertical section of Figure 1 taken along line 2—2.

Referring now to the drawings, Figures 1, 2, 3 and 4 show the apparatus that includes the pressurized coal scale. A downspout 20 having a conventional coal valve 21 at its upper end is joined by known means to a housing 22. It is to be understood that the top of the downspout 20 is normally connected or bolted to the bottom outlet of a coal hopper or bunker. The housing 22 encloses a conveyor assembly consisting of a feed belt 23 supported on pulleys 26. Skirt plates 24 are also arranged along the edges of the conveyor belt 23. These plates 24 depend from the top of housing 22. Also enclosed in the housing 22 is a weigh hopper 27. The above-described members are arranged inside housing 22 so that coal passing through downspout 20 will fall onto the rear end of belt 23. The coal falling off the forward end of belt 23 will be received in the weigh hopper 27.

The weigh hopper 27 has two pins 28 projecting from opposite sides. The pins 28 are given rigidity by a conventional strut arrangement 33. A loop 29 attached to one end of a shaft 30 is secured to each pin 28. The other ends of the shafts 30 project through partitions 32 and into compartments 34 where they are joined to scale bearing loops 31. The shafts 30, at the points of projection through the partitions 32 are encased in molded rubber bellows 25 so that the compartments 34 are maintained pressure tight with respect to the space occupied by the weigh hopper 27 and the conveyor assembly. The compartments 34 communicate with an auxiliary housing 35. The scale-bearing loops 31 cooperate with pivot pins 50 rigidly fastened to weigh levers 36 to provide a knife edge attachment for the weigh hopper 27 with one end of weigh levers 36. A knife edge pivot is provided for each of the weigh levers 36 by pivot pins 51 rigidly fastened to weigh levers 36 cooperating with scale-bearing loops 37 which are similar to scale-bearing loops 31. The scale-bearing loops 37 are suspended from the top walls of the compartments 34. The other ends of the weigh levers 36 are interconnected by a bar 38 so that they will operate as a single unit. Scale-bearing loops 39 similar to scale-bearing loops 31 and 37 cooperate with pivot pins 52 rigidly fastened to weigh levers 36 to form a knife edge attachment for a counterweight 40 with the other ends of weigh levers 36. The counterweight 40 is suspended between the scale-bearing loops 39. The weigh hopper 27 is also conventionally provided with a pivoted counterweighted closure member 41 operated in a suitable manner such as by a solenoid to keep member 41 locked shut. At the proper time responsive to the scale lever system, the solenoid is disenergized and the weight of the coal in the hopper 27 causes the member 41 to swing open. When the hopper 27 is empty, the counterweight swings the member 41 shut and the solenoid is energized to effect the locking action. Doors 42 are also formed in housing 22 to permit access to the weigh hopper 27, conveyor assembly, and to electrical equipment located within.

The auxiliary housing 35 contains a motor 43, the shaft of which is connected to a gear reducer 44. The output shaft 45 of the gear reducer 44 passes through housing 22 and has a gear 46 mounted on its end. A gear 47 mounted on a shaft 48 meshes with gear 46. The shaft 48 is joined to the forward pulley 26. As above-described, the motor 43 is mechanically connected to the forward pulley 26 and thereby power is supplied to drive the conveyor belt 23. The auxiliary housing 35 is also provided with doors 49. The motor 43 is driven responsive to the scale lever system.

Figure 3:
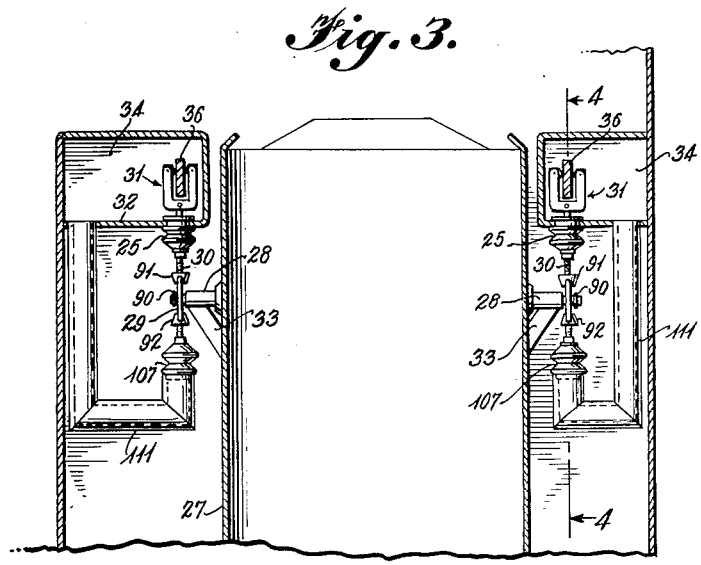
Figure 3 is a view in vertical section of Figure 2 taken along line 3—3.
Figure 4:
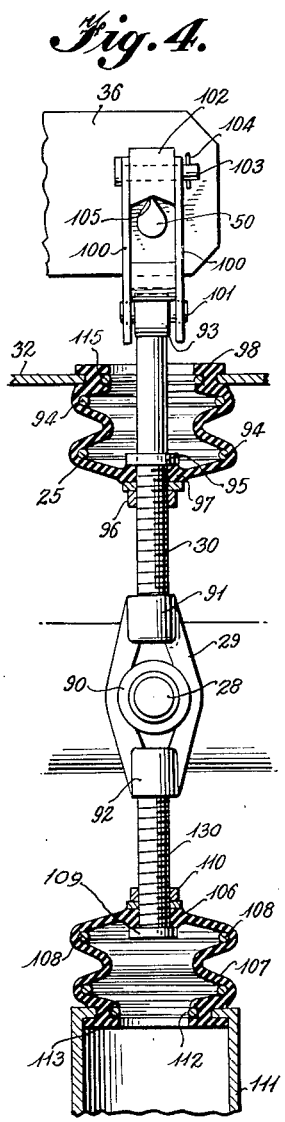
Figure 4 is a view in vertical section of Figure 3 taken along line 4—4.

Referring more particularly now to Figures 3 and 4, the loop 29 engaging with each pin 28 is held in place by a retaining ring 90. A pair of internally threaded sockets 91 and 92 form the top and bottom of each loop 29. One end of shaft 30 fits into the top socket 91 and the other end 30 projects through partition 32 and into compartment 34 where it fits into a spacer block 93 in scale-bearing loop 31. The compartments 34 are maintained pressure tight with regard to the compartment holding the weigh hopper 27 by means of molded rubber bellows 25. Each bellows 25 has a series of stiffening rings 94 to prevent collapse of the bellows and is retained on shaft 30 by having one of its ends 97 engaged between a fixed flange 95 and a washer-nut assembly 96. The other end 98 of the bellows 25 is open to compartment 34 and is undercut to tightly engage partition 32. Additionally, a retaining ring 115 tightly holds end 98 in position.

Each of the scale-bearing loops 31 consists of two U-shaped plates 100 fixed in spaced relation by connecting them at their bottom by mounting on trunnions 101 on a spacer block 93 for free pivotal movement. The ends of their legs are joined by a bearing block 102 and pins 103 with the aid of cotter pins 104 to prevent pins 103 from slipping out. The under surface of bearing block 102 is concave. Pivot pins 50 presenting an edge 105 at their top portion are rigidly fastened to weigh levers 36 and cooperate with the concave undersurface of the bearing block 102 to provide a knife edge support for the weigh hopper 27 with one end of each of the weigh levers 36.

A shaft 130 is fitted into the bottom socket 92. One end 106 of a molded rubber bellows 107 having stiffening rings 108 to prevent collapse is held on the end of shaft 130 by being engaged between a flange 109 fixed to the end of the shaft 130 and a washer-nut assembly 110. The other end 113 of the bellows 107 is undercut and fits within a tube 111. A retaining ring 112 securely embraces the bellows 107 with the tube 111. The other end of tube 111 is fitted into partition 32 so that the interior of bellows 107 communicates directly with compartments 34. In this manner the interior of bellows 25 and 107 all open into compartments 34, and hence the pressure inside the bellows 25 and 107 is the same as that in compartments 34. Also the exteriors of bellows 25 and 107 are subjected to the pressure in housing 22. Consequently, the upward force on shaft 30 caused by the exertion of pressure on the exterior of bellows 25 is offset by the downward force on shaft 130 as a result of the exertion of the pressure on bellows 107. Since the magnitudes of the pressures are equal and their directions diametrically opposed, the resultant force is zero. Hence no weighing errors will be introduced due to a pressure differential existing between housing 22 and compartments 34 which are open, of course, to auxiliary housing 35.

While the above has been described in conjunction with the use of supporting the weigh hopper 27 by means of two connecting rods 30, nevertheless, it is equally applicable to weigh hopper supporting arrangements employing three, four, or more of such connecting rods. In this regard, each connecting rod is provided with a molded rubber bellows for sealing purposes and a second rubber bellows arranged as described with Figures 3 and 4 so that the force exerted on the bellows sealing the connecting rod due to the pressure in housing 22 is diametrically opposed by the second rubber bellows to the point of equalization.

Figure 5:
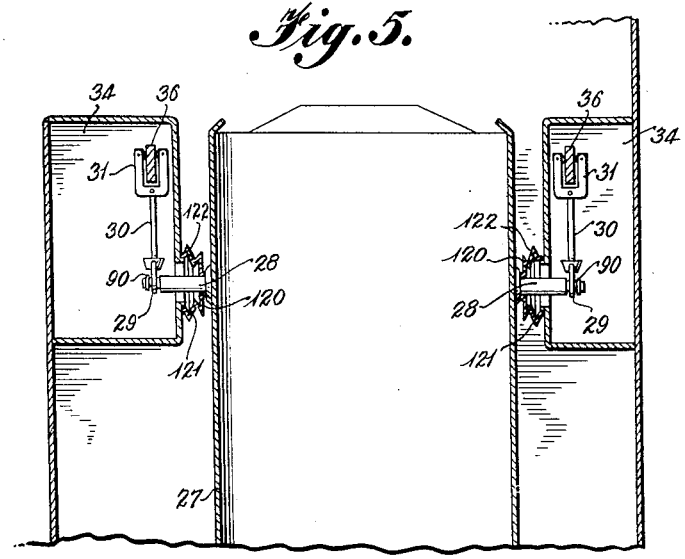
Figure 5 is a view in vertical section similar to Figure 3, showing a modified form of the invention.

A modification of this invention is illustrated in Figure 5. Here, as before, the weigh hopper 27 is a separate compartment from the weigh lever assembly. The weigh hopper 27 has two pins 28 which project horizontally into compartments 34. Each pin 28 has mounted thereon concentrically a molded rubber bellows 120 which serves to seal the weigh hopper compartment from compartments 34. The attachment of bellows 120 is effected in a suitable manner. A loop 29 attached to one end of a shaft 30 is secured to each pin 28. A retaining ring 90 holds each loop 29 in position. The other ends of the shafts 30 are joined to scale-bearing loops 31 to cooperate with pivot pins and provide a knife edge attachment for the weigh hopper 27 with one end of weigh levers 36 as previously described.

In utilizing this particular arrangement, each bellows 120 automatically balances the vertical forces caused by pressure in the weigh hopper compartment. That is, the force exerted on the bottom half 121 of bellows 120 which produces an air piston action tending to raise the weigh hopper 27 is exactly counterbalanced by the force exerted on the top half 122 of bellows 120 which produces an air piston action tending to push the weigh hopper 27 downward. As the pressure in the weigh hopper compartment exerts forces in all directions there is a horizontal component of the force caused by the pressure which tends to push the weigh hopper 27 sideways by acting on the bellows 120. This horizontal component is counterbalanced by symmetrically positioning the supports about the longitudinal axis of the weigh hopper. Hence the resultant of the horizontal components is equal to zero. Therefore, any number of supports can be utilized. For example, if two supports are employed, they are positioned on opposite sides of the weigh hopper so that the force tending to move the weigh hopper 27 sideways in one direction is exactly counterbalanced by an equal force tending to move the weigh hopper in the opposite direction. If three supports are utilized, they are positioned around the weigh hopper 120° apart. Consequently the resultant of the horizontal components of the forces exerted on the supports is equal to zero. Further, the support rods for the weigh hopper can be positioned at an angle as distinguished from the vertical and horizontal positions previously mentioned. In this case, the balancing of the forces acting on the supports can be accomplished by considering them in terms of their horizontal and vertical components and treating the components as above described.

While this invention has been described in specific embodiments, nevertheless, various changes and modifications obvious to one skilled in the art are within the spirit, scope and contemplation of the present invention.

What is claimed is:

1. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections extending through a wall dividing said compartments, a first resilient bellows means mounted with said operating connections to seal said operating connections, and a second resilient bellows means cooperating with said first resilient bellows means to counterbalance the force exerted on said first resilient bellows means caused by said pressure difference.

2. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections extending through a wall dividing said compartments, a first resilient bellows means mounted with said operating connections to seal said operating connections, and a second resilient bellows means cooperating with said first resilient bellows means to counterbalance the force exerted on said first resilient means caused by said pressure difference, the interiors of said first and second resilient bellows means open to the compartment holding said scale mechanism, and the exteriors of said first and second resilient bellows means exposed to the compartment holding said weigh hopper.

3. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections including a horizontal pin fixed on said weigh hopper and a vertical connecting rod mounted between said pin and said scale mechanism so that said rod extends through a wall dividing said compartments, a first resilient bellows means to seal said rod, a second rod depending from said horizontal pin, and a second resilient bellows means mounted on said second rod, and the interior of said second resilient bellows means in direct communication with the interior of said first resilient bellows means so that the force exerted on said first resilient bellows means caused by said pressure difference is counterbalanced by said second resilient bellows means.

4. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections including a plurality of horizontal pins fixed on said weigh hopper and a vertical connecting rod mounted between each of said pins and said scale mechanism so that said rods extend through walls dividing said compartments, a first resilient bellows means to seal each of said rods, a second rod depending from each of said pins, and a second resilient means mounted on each of said second rods, and the interiors of said second resilient bellows means in direct communication with the interiors of said first resilient bellows means so that the force exerted on said first resilient bellows means caused by said pressure difference is counterbalanced by said second resilient bellows means.

5. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections including a horizontal pin fixed on said weigh hopper so that said pin extends through a wall dividing said compartments, a first resilient bellows means mounted on said pin, and a second resilient bellows means mounted on said pin cooperating with said first resilient bellows means to seal said pin so that the force exerted on said first resilient bellows means caused by said pressure difference is counterbalanced by said second resilient bellows means.

6. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections including a pair of horizontal pins fixed on opposite sides of said weigh hopper so that said pins extend through walls dividing said compartments, a first resilient bellows means mounted on each of said pins, and a second resilient bellows means mounted on each of said pins cooperating with said first resilient means to seal said pins so that the force exerted on said first resilient bellows means caused by said pressure difference is counterbalanced by said second resilient bellows means.

7. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load in said hopper, means responsive to said scale mechanism for operating said hopper, operating connections between said scale mechanism and said hopper, said operating connections extending through a wall dividing said compartments, and resilient bellows means mounted with said operating connections to seal said operating connections, said operating connections and said resilient bellows means being arranged with respect to said weigh hopper so that said bellows means does not transmit any force to said operating connections as a result of said pressure difference.

8. An apparatus for batch-continuous weighing of aggregate material that comprises an airtight housing divided into two air-tight compartments, said compartments being under different pressures, an entrance and an exit for aggregate material connected to one of said compartments, a weigh hopper positioned in said compartment to receive and discharge said aggregate material as it passes through said compartment, a scale mechanism located in the other compartment for determining the load on said hopper, means responsive to said scale mechanism for operating said hopper, operating connections between said scale mechanism and said hopper, said operating connections including at least two horizontal pins fixed on said weigh hopper so that said pins extend through walls dividing said compartments, a resilient bellows mounted on each of said pins to seal said pins, said pins and their corresponding resilient bellows being symmetrically arranged with respect to the longitudinal axis of said weigh hopper so that the resultant of the horizontal forces exerted on said bellows by virtue of said pressure difference is always equal to zero.

JOSEPH WRAY FOGWELL.
ARTHUR J. STOCK.

References Cited in the file of this patent

UNITED STATES PATENTS

| Number | Name | Date |
|---|---|---|
| 570,299 | Richards | Oct. 27, 1896 |
| 1,839,373 | Bryce | Jan. 5, 1932 |
| 1,853,199 | Bryce | Apr. 12, 1932 |
| 2,138,356 | Ryan | Nov. 29, 1938 |